United States Patent
Woo et al.

(10) Patent No.: US 12,541,724 B2
(45) Date of Patent: Feb. 3, 2026

(54) SYSTEMS AND METHODS FOR TIME-SERIES FORECASTING

(71) Applicant: Salesforce, Inc., San Francisco, CA (US)

(72) Inventors: Gerald Woo, Singapore (SG); Chenghao Liu, Singapore (SG); Doyen Sahoo, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 150 days.

(21) Appl. No.: 17/588,032

(22) Filed: Jan. 28, 2022

(65) Prior Publication Data

US 2023/0105970 A1 Apr. 6, 2023

Related U.S. Application Data

(60) Provisional application No. 63/252,877, filed on Oct. 6, 2021.

(51) Int. Cl.
*G06Q 10/00* (2023.01)
*G06N 3/08* (2023.01)
*G06Q 10/04* (2023.01)

(52) U.S. Cl.
CPC ............. *G06Q 10/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2019/0354807 A1* | 11/2019 | Tsai | G06V 10/764 |
| 2019/0379589 A1* | 12/2019 | Ryan | G06F 17/142 |
| 2022/0058669 A1* | 2/2022 | Yin | G06Q 30/0202 |
| 2022/0358356 A1* | 11/2022 | Gusat | G06N 3/045 |
| 2023/0052540 A1* | 2/2023 | Tomsett | G06N 3/09 |

FOREIGN PATENT DOCUMENTS

WO WO-2017055878 A1 * 4/2017 ........... G06K 9/3241

OTHER PUBLICATIONS

H Wang, Z Lei, X Zhang, B Zhou, J Peng et al. (A review of deep learning for renewable energy forecasting), Energy Conversion and . . . , 2019—Elsevier. (Year: 2019).*

(Continued)

*Primary Examiner* — Hafiz A Kassim
(74) *Attorney, Agent, or Firm* — Haynes and Boone, LLP

(57) ABSTRACT

A method includes receiving, via a data interface, a training dataset of time-series data samples; and generating, by an encoder of a representation training model, intermediate representations of a training data sample from the training dataset. One or more trend feature representations are generated based on the intermediate representations. One or more seasonal feature representations are generated based on the intermediate representations. The representation training model is trained, using the one or more trend feature representations and one or more seasonal feature representations, to generate a trained representation training model.

16 Claims, 5 Drawing Sheets

(56) References Cited

OTHER PUBLICATIONS

Dr. S. Chen et al. (Intelligent Nonlinear Learning Machines), 2005—School of Electronics and Computer Science—southampton.ac.uk (Year: 2005).*
AM Sarroff, V Shepardson, MA Casey (Learning representations using complex-valued nets), arXiv preprint arXiv:1511.06351, 2015—arxiv.org (Year: 2015).*
F Bonin, F Dell'Orletta, G Venturi, S Montemagni (A contrastive approach to multi-word term extraction from domain corpora), Proceedings of the 7th International Conference on Language Resources and . . . , 2010•lrec.elra.info (Year: 2010).*
24. F Bonin, F Dell'Orletta, G Venturi, S Montemagni (A contrastive approach to multi-word term extraction from domain corpora), Proceedings of the 7th International Conference on Language Resources and . . . , 2010•lrec.elra.info (Year: 2010).*
Zhihan Yue, Yujing Wang, Juanyong Duan, Tianmeng Yang, Congrui Huang, Yunhai Tong, and Bixiong Xu. TS2Vec: Towards Universal Representation of Time Series, 2021.
Bernhard Scholkopf, Francesco Locatello, Stefan Bauer, Nan Rosemary Ke, Nal Kalchbrenner, Anirudh Goyal, an Yoshua Bengio. Toward causal representation learning. Proceedings of the IEEE, 109(5):612-634, 2021.

\* cited by examiner

SYSTEMS AND METHODS FOR TIME-SERIES FORECASTING

RELATED APPLICATIONS

This application claims priority to U.S. Provisional Patent Application No. 63/252,877 filed Oct. 6, 2021, which is incorporated by reference herein in its entireties.

TECHNICAL FIELD

The embodiments relate generally to time series data processing and machine learning systems, and more specifically to compositional seasonal-trend representations for time-series forecasting.

BACKGROUND

Time series constitutes a prevalent form of data whose analysis has several important applications in areas, such as business, medicine, aerospace, and information systems. For example, time-series analysis is often applied in anomaly detection. Classical time series analysis often processes the time series data by considering trend and seasonal components. Some existing systems adopt deep learning to time series analysis task such as forecasting and anomaly detection. But most such systems learn the relevant models in a supervised end-to-end fashion.

As time-series data is a high dimensional and complex form of data, it is often challenging and expensive to label time-series data in order to perform supervised learning tasks, such as time-series classification. For example, in the medical setting, the task of identifying cardiac abnormalities from electrocardiogram (ECG) data requires expert knowledge and thus manual annotation can be costly. Another example is emotion recognition through electroencephalogram (EEG) and ECG signals, in which elaborate experiments are carried out to collect labelled data. Unlabeled data, on the other hand, is usually cheaply available.

Therefore, there is a need for a mechanism for improved time-series forecasting including making use of the unlabeled data.

Figure 1B:
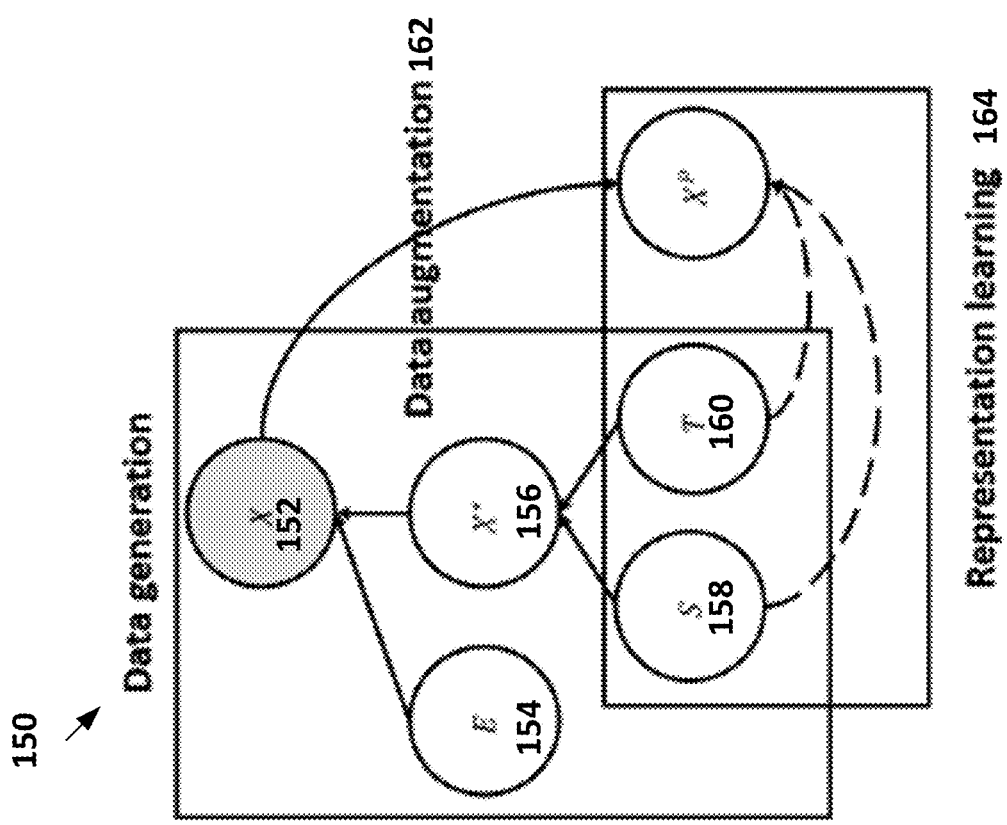
FIG. 1B is a causal graph demonstrating the generative process of time series data, according to embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Time series forecasting may be applied to various domains, such as electricity pricing, demand forecasting, capacity planning and management, and anomaly detection. Time series data can often take a complex form and thus make labeling task challenging and expensive. For example, in the medical setting, the task of identifying cardiac abnormalities from ECG data requires expert knowledge. Another example is emotion recognition through EEG and ECG signals, in which elaborate experiments have to be carried out to collect labelled data.

In various embodiments, deep learning may be applied for forecasting. Owing to the increase in data availability and computational resources, these approaches with deep learning may promising performance over conventional methods for forecasting. In various embodiments, the methods applying deep learning for forecasting may be jointly learn feature representations and the prediction function (or forecasting function) by stacking a series of nonlinear layers to perform feature extraction, followed by a regression layer focused on forecasting. However, jointly learning these layers end-to-end from observed data may lead to the model over-fitting and capturing spurious correlations of the unpredictable noise contained in the observed data. In some embodiments, this situation is exacerbated when the learned representations are entangled. In some entangled learned representations, a single dimension of the feature representation may encode information from multiple local independent modules of the data-generating process, and a local independent module may experience a distribution shift. For example, an observed time series is generated by a seasonal module and nonlinear trend module. If it is known that the seasonal module has experienced a distribution shift, a reasonable prediction may be made based on the invariant trend module. However, if an entangled feature representation (e.g., encoding information from both the seasonal module and the trend module) is learned from the observed data, it would be challenging for the learned model to handle this distribution shift, even if it only happens in a local component of the data-generating process. As such, the learned representations and prediction associations from the end-to-end training approach may be unable to transfer or generalize well when the data is generated from a nonstationary environment, a very common scenario in the time series analysis.

Therefore, as discussed in detail below, learning disentangled seasonal-trend representations may improve the performance for time series forecasting. A time series model may formulate time series as a sum of trend, seasonal and error variables, and exploit such prior knowledge to learn time series representations. Learning disentangled seasonal-trend representation are robust to interventions on the error variable. In various embodiments, interventions on the error variable are introduced via for example data augmentations, and the disentangled seasonal-trend representations are learned via for example contrastive learning. In various embodiments, the system may leverage inductive biases in the model architecture to learn disentangled seasonal-trend representations, efficiently learn trend representations, mitigating the problem of look-back window selection by introducing a mixture of auto-regressive experts. It may learn more powerful seasonal representations by leveraging a learnable Fourier layer which enables intra-frequency interactions. Both trend and seasonal representations are learned via contrastive loss functions. The trend representations are learned in the time domain, whereas the seasonal representations are learned via a novel frequency domain contrastive loss which encourages discriminative seasonal representations and side steps the issue of determining the period of seasonal patterns present in the data. Such a system is robust to various choices of backbone encoders, as well as downstream regressors.

Furthermore, decoupling the representation learning and supervised downstream tasks may improve the performance of time series learning. For example, for the forecasting task of the data-generating process to be a hidden Markov model, a supervised forecasting task $p(x_{t+1}|x_t)$ relies on spurious correlations via the latent confounders. While this strategy may work well for the in-distribution supervised learning setting, when dealing with nonstationary time series where out-of-distribution future time steps are predicted, this may lead to catastrophic results. Thus, by decoupling the representation and downstream forecasting task, representations of the direct causes for the desired dependent variable are first learnt, resulting in a regression task which follows a causal mechanism.

Thus, embodiments described herein provide an improved framework for time series forecasting by learning disentangled seasonal and trend representations of time series.

Figure 1A:
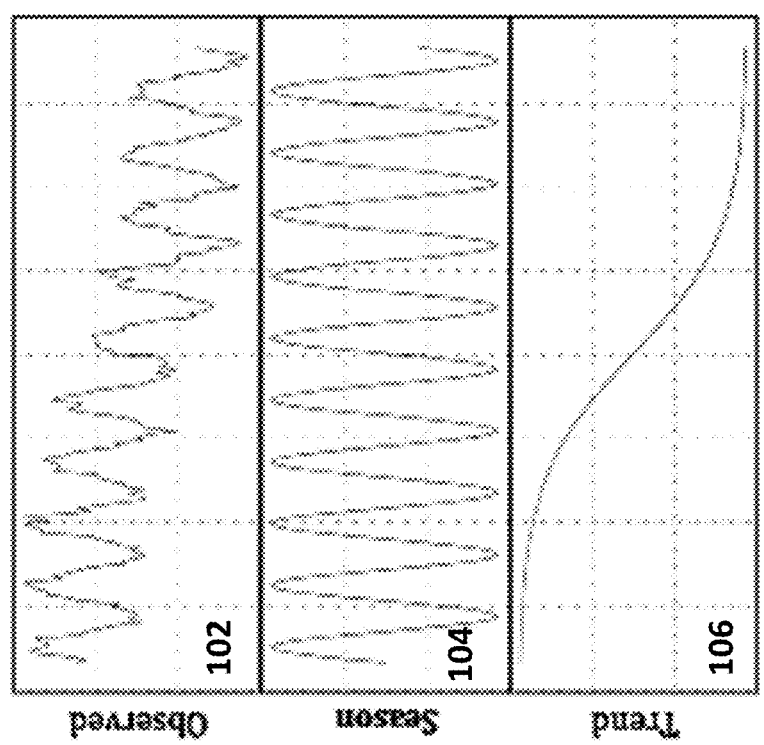
FIG. 1A is a diagram illustrating an example observed time series data including seasonal and trend components, according to embodiments described herein.

Referring to FIGS. 1A and 1B, in various embodiments, the observed time series data include a seasonal component and a trend component. Specifically, as shown in the example of FIG. 1A, where the observed time series 102 includes a seasonal component 104 (e.g., generated by a seasonal module) and a trend component 106 (e.g., generated by a nonlinear trend module). The seasonal component 104 has seasonality representing a repeating short-term cycle in the series. The trend component 106 has a trend indicating the increasing or decreasing value in the series.

As shown in FIG. 1B, an example causal graph 150 demonstrating the generative process of time series data including both seasonal and trend components is illustrated. In various embodiments, the time series forecasting problem may be formulated as follow: Let $(x_1, \ldots, x_T)$ be a time series, where m denotes the dimension of observed signals. Given the look-back window h, the goal of time series forecasting for the next k steps is defined as $\hat{X}=g(X)$, where $g(*)$ denotes the prediction mapping function, and $\hat{X}$ predicts the next k time steps of X.

Given the problem formation, instead of jointly learning the representation and prediction association through $g(*)$, a system may focus on learning feature representations from observed data, with the goal of improving predictive performance. Specifically, a nonlinear feature embedding function $V=f(X)$ is learned to project m-dimensional raw signals into a d-dimensional latent space for each timestamp. Subsequently, the learned representation of the final timestamp $v_h$ is used as inputs for the downstream regressor of the forecasting task.

In various embodiments, complex data may arise from the rich interaction of multiple sources. A goal of the representation is to disentangle the various explanatory sources, making it robust to complex and richly structured variations. Not doing so may otherwise lead to capturing spurious features that do not transfer well under non-independent and identically distributed (i.i.d.) data distribution settings. To achieve this goal, structural priors for time series is introduced. As illustrated in the causal graph 150 in FIG. 1B, it is assumed that the observed time series data X 152 is generated from the error variable E 154 and the error-free latent variable X* 156. X* 156 in turn, is generated from the trend variable T 160 and seasonal variable S 158. As E 154 is not predictable, the optimal prediction can be achieved by uncover X* 156 which only depends on T 160 and S 158, and does not depend on E 154.

In some embodiments, end-to-end deep forecasting methods, apart from modeling multivariate interactions, directly model the time-lagged relationship along the observed data X 152. However, in those embodiments, each X 152 includes unpredictable noise E 154, which might lead to capturing spurious correlations. Thus, to address this issue and improve performance, methods for learning the error-free latent variable X* 156 may be used.

In various embodiments, the seasonal and trend modules do not influence or inform each other. Therefore, even if one mechanism changes due to a distribution shift, the other remains unchanged. Accordingly, disentangling seasonality and trend leads to better transfer, or generalization in non-stationary environments. Furthermore, independent seasonal and trend mechanisms can be learned independently and be flexibly re-used and re-purposed.

Further, interventions on E does not influence the conditional distribution P(X*|T,S), i.e. $P^{do(E=e_i)}(X^*|T,S)=P^{do(E=e_j)}(X^*|T,S)$, for any $e_i$ and $e_j$ in the domain of E. Thus, S and T are invariant under changes in E. Learning representations for S and T allows to find a stable association with the optimal prediction (of X*) in terms of various types of errors. Since the targets X* are unknown, a proxy contrastive learning task may be constructed. For example, data augmentation 162 may be used as interventions on the error E. For further example, invariant representations of T and S may be learned via representation learning 164, e.g., contrastive learning. While it may be impossible to generate all possible variations of errors, the data augmentations may include various augmentations including for example, scale, shift, jitter, any other suitable augmentations, and/or a combination thereof, which can simulate a large and diverse set of errors, beneficial for learning better representations.

Figure 2:
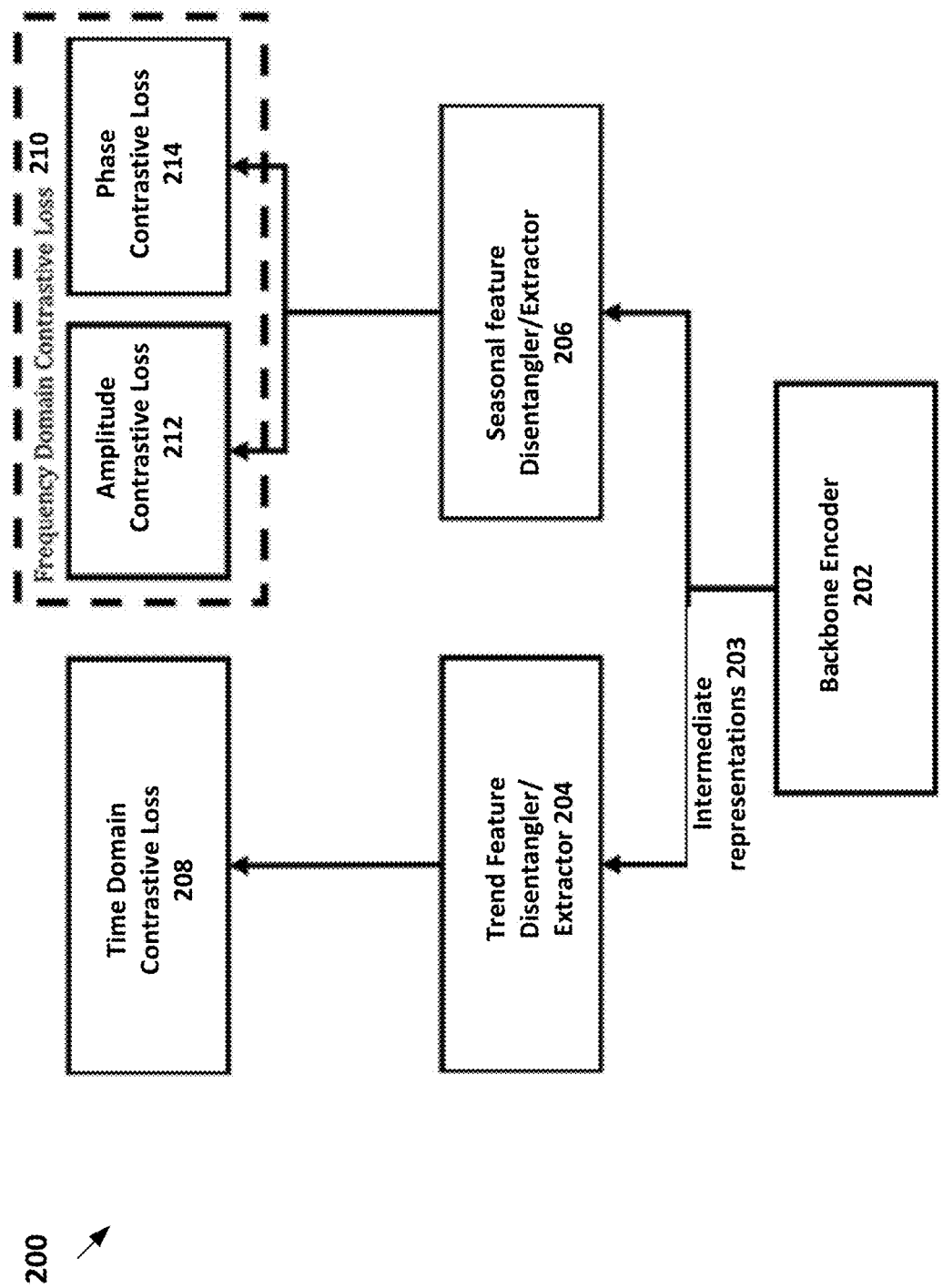
FIG. 2 is a simplified diagram illustrating a framework for learning disentangled seasonal-trend time series representations, according to embodiments described herein.

Referring to FIG. 2, illustrated is a simplified diagram illustrating a system 200 for learning disentangled seasonal-trend representations for time series forecasting, according to embodiments described herein. The system 200, also referred to as a representation learning model 200, learns representations, which includes disentangled representations for seasonal and trend components for each time step, e.g., denoted as $V=[V^{(T)}; V^{(S)}]$, where the disentangled representations V include trend feature representations $V^{(T)}$ (also referred to as trend representations) and seasonal feature representations $V^{(S)}$ (also referred to as seasonal representations).

In the system 200, a backbone encoder 202 maps observations to a latent space, e.g., projecting m-dimensional raw signals into a d-dimensional latent space for each timestep. The backbone encoder may use various types of encoders, including for example, a Temporal Convolution Network. Various representations (e.g., trend representations, seasonality representations, any other suitable representations) may be constructed from the intermediate representations 203 generated by the backbone encoder 202. For example, trend feature disentangler 204 (also referred to as a trend feature extractor 204) may extract the trend representations (e.g., via a mixture of auto-regressive experts), and may be learnt via a time domain contrastive loss 208 (denoted as $L_{time}$) using contrastive learning. The trend representations are disentangled from the seasonal representations, and do not include seasonal features for the seasonal component. For further example, seasonal feature disentangler 206 (also referred to as a seasonal feature extractor 206) may extract the seasonal representations (e.g., via a learnable Fourier layer), and may be learned by a frequency domain contrastive loss 210 using contrastive learning. The frequency domain contrastive loss 210 may include an amplitude contrastive loss 212 (denoted as $L_{amp}$), a phase contrastive loss 214 (denoted as $L_{phase}$), any other suitable frequency domain contrastive loss components, and/or a combination thereof. The neural network model of system 200 may then be learnt in an end-to-end fashion, with an overall loss function L that is generated based on the time domain contrastive loss 208, the frequency domain contrastive loss 210, any other suitable losses, and/or a combination thereof. In an example, the overall loss function L may be provided as follows:

$$\mathcal{L} = \mathcal{L}_{time} + \frac{\alpha}{2}(\mathcal{L}_{amp} + \mathcal{L}_{phase}),$$

where α a hyper-parameter which balances the trade-off between trend and seasonal factors. The trend feature representations from the trend feature disentangler 204 and the seasonal feature representations from the seasonal feature disentangler 206 may be concatenated to generate the final output representations.

Figure 3A:
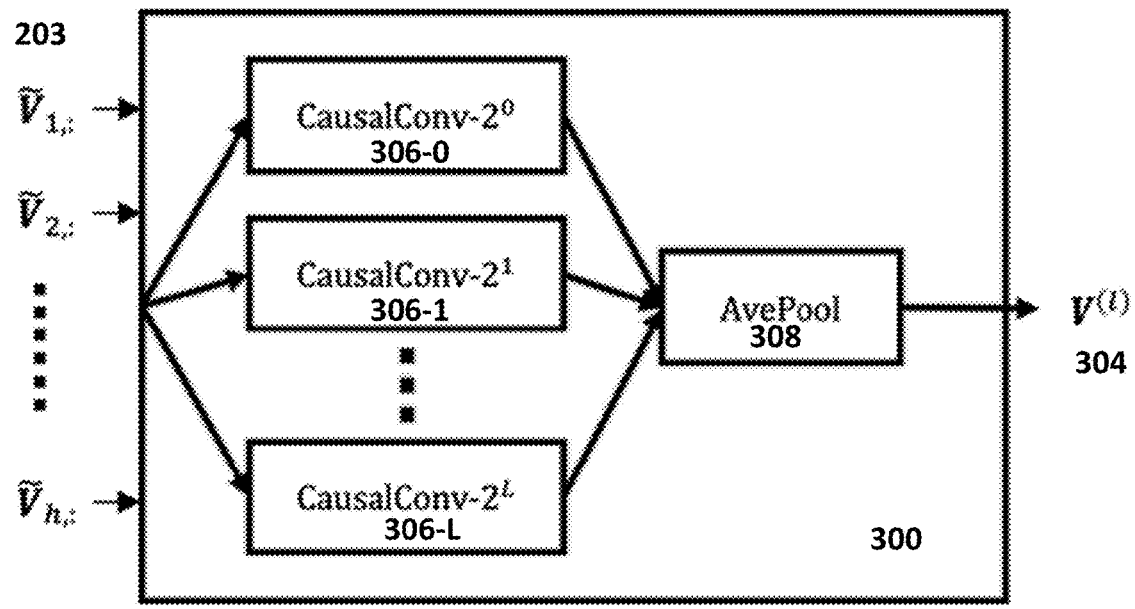
FIG. 3A is a simplified diagram illustrating an example structure of a trend feature aggregator, according to embodiments described herein.
Figure 3B:
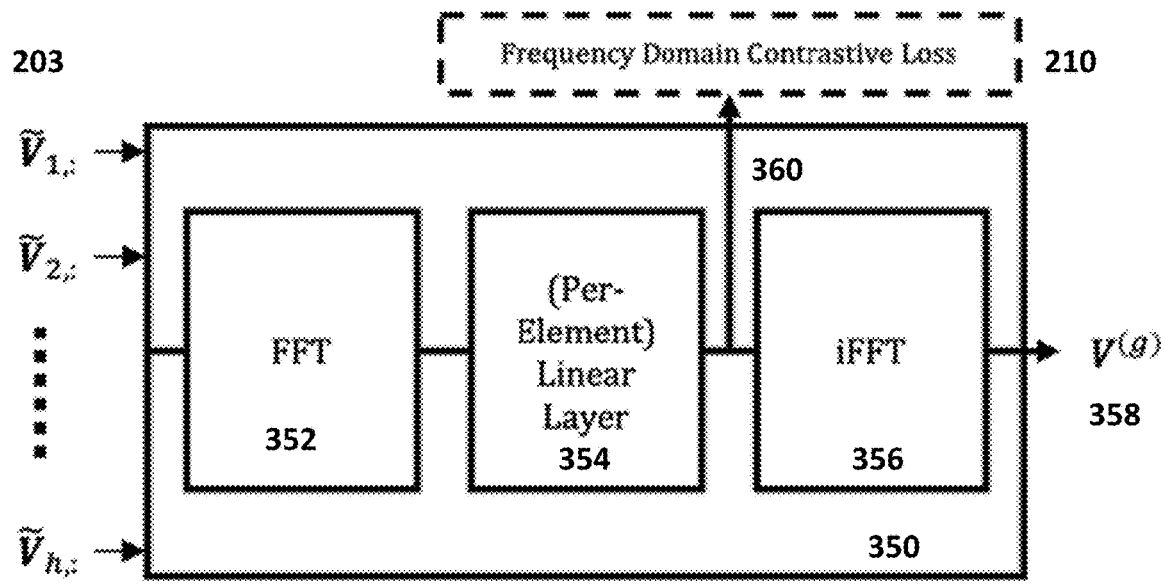
FIG. 3B is a simplified diagram illustrating an example structure of a seasonality feature aggregator, according to embodiments described herein.

Referring to FIGS. 3A and 3B, example trend feature disentangler 300 (e.g., for implementing trend feature disentangler 204 of FIG. 2) and seasonal feature disentangler 350 (e.g., for implementing seasonal feature disentangler 206) are illustrated.

Referring to FIG. 3A, an example trend feature disentangler 300 receives the intermediate representations 203, and provides the intermediate representations 203 to a composition of a mixture of autoregressive experts 306-0 through 306-L (e.g., instantiated as id-causal convolutions with kernel size of $2^i$, where i=0, . . . , L), where L is a hyper-parameter. An average pool unit 308 follows to average the L+1 representations to generate the output feature representations 304.

Extracting the underlying trend is crucial for modeling time series. Auto-regressive filtering may be to capture time-lagged causal relationships from past observations. One challenge is to select the appropriate look-back window: a smaller window leads to under-fitting, while a larger model leads to over-fitting and over-parameterization issues. In some examples, this hyper-parameter is optimized by grid search on the training or validation loss, but such an approach is too computationally expensive. In examples like those illustrated in FIG. 3A, a mixture of auto-regressive experts may be used to adaptively select the appropriate look-back window. As illustrated in FIG. 3A, in some embodiments, the trend feature disentangler 300 may include a mixture of L+1 autoregressive experts. In an example, $L=\lfloor \log_2(h/2) \rfloor$. Each expert 306-I may be implemented as a id causal convolution with d input channels and $d_T$ output channels, where the kernel size of the i-th expert is 2i. Each expert outputs a matrix $\tilde{V}^{(T,i)}=\text{CausalConv}(\tilde{V}, 2^i)$.

An average-pooling operation may be performed over the outputs to obtain the final trend representations, by average pool unit 308, as follows:

$$V^{(T)} = \text{Ave Pool}(\tilde{V}^{(T,0)}, \tilde{V}^{(T,1)}, \ldots, \tilde{V}^{(T,L)}) = \frac{1}{(L+1)}\sum_{i=0}^{L}\tilde{V}^{(T,0)}.$$

In various embodiments, contrastive learning is used. Contrastive learning via the instance discrimination task is a powerful approach for self-supervised learning. Firstly, a family of data augmentations is defined. Given a single sample of data $x_i$, two data augmentation operators a and a' are sampled, where $q_i=f(a(x_i))$ is referred to as the query representation with encoder f, and ki=f(a'(xi)) is the positive key representation. Finally, the loss function may be provided as follows:

$$L = \sum_{i=1}^{N} -\log \frac{\exp(q_i \cdot k_i/\tau)}{\exp(q_i \cdot k_i/\tau) + \sum_{j=1}^{K}\exp(q_i \cdot k_j/\tau)},$$

Where τ is the temperature hyper-parameter, kj are negative key representations, and K is the total number of negative samples. In some examples, an efficient mechanism may be used to obtain negative samples—by simply treating all other samples in the mini-batch as negative samples, i.e. K=N−1. In some embodiments, a queue of size K (a hyper-parameter) may be used to obtain negative samples. At each iteration of training, simply pop N samples from the queue, and push the N representations form the current mini-batch.

A contrastive loss in the time domain (e.g., time domain contrastive loss 208) may be used to learn discriminative trend representations. For example, a momentum encoder may be used to obtain representations of the positive pair, and a dynamic dictionary with a queue may be used to obtain negative pairs. Then, given N samples and K negative samples, the time domain contrastive loss 208 may be provided as follows:

$$\mathcal{L}_{time} = \sum_{i=1}^{N} -\log \frac{\exp(q_i \cdot k_i/\mathcal{T})}{\exp(q_i \cdot k_i/\mathcal{T}) + \sum_{j=1}^{K}\exp(q_i \cdot k_j/\mathcal{T})},$$

where given a sample V (T), a random time step t is selected for the contrastive loss, and a projection head is applied, which is a one-layer MLP to obtain q, and k is respectively the augmented version of the corresponding sample from the momentum encoder/dynamic dictionary.

FIG. 3B is a simplified diagram illustrating an example seasonal feature disentangler 350. The seasonal feature disentangler 350 includes a fast Fourier Transform (FFT) unit 352 that transforms the intermediate representations 203 into frequency domain via fast Fourier Transform (FFT). Then a (complex-valued) linear layer 354 with unique weights for each frequency is applied. Then, an inverse FFT is performed by iFFT unit 356 to map the representations back to time domain, to form the seasonal representations 358.

In various embodiments, spectral analysis in the frequency domain is used in seasonality detection, and the seasonal feature disentangler 350 handles the learning of seasonal representations the frequency domain. Seasonal feature disentangler 350 address provides support for intra-frequency interactions (between feature dimensions), which allows the representations to encode periodic information more easily. For example, seasonal feature disentangler 350, by using learnable Fourier layer 354, captures intra-frequency level interaction. Then, to learn these seasonal features without prior knowledge of the periodicity, a frequency domain contrastive loss 210 is introduced for each frequency.

As illustrated in FIG. 3B, seasonal feature disentangler 350 includes a discrete Fourier transform unit 352 to map the intermediate features to frequency domain, followed by a learnable Fourier layer 354. Discrete Fourier transform (DFT) is applied along the temporal dimension, and maps the time domain representations $\tilde{V}$ into the frequency domain, denoted as $F(\tilde{V})$. Then the learnable Fourier layer 354 (e.g., implemented via a perelement linear layer), enables frequency domain interactions. The learnable Fourier layer 354 may apply an affine transform on each frequency, with a unique set of complex-valued parameters for each frequency. Finally, the representation is transformed back to time domain using an inverse DFT operation, by the iFFT unit 356. The final output matrix of this layer is the seasonal representation, $V^{(S)}$. In some examples, the i, k-th element of the output may be denoted as follows:

$$V_{i,k}^{(S)} = \mathcal{F}^{-1}\left(\sum_{j=1}^{d} A_{i,j,k} \mathcal{F}(\tilde{V})_{i,j} + B_{i,k}\right),$$

where A and B are parameters of the learnable Fourier layer 354.

As illustrated in the example of FIG. 3B, the inputs to the frequency domain loss functions for determining a frequency domain loss 210 are the pre-iFFT representations 360. These are complex-valued representations in the frequency domain. To learn representations which are able to discriminate between different seasonal patterns, a frequency domain loss function is used. Because the data augmentations can be interpreted as interventions on the error variable, the seasonal information does not change. Thus, a contrastive loss in frequency domain corresponds to discriminating between different periodic patterns given a frequency. To overcome the issue of constructing a loss function with complex-valued representations, each frequency can be uniquely represented by its amplitude and phase representations. Then, example loss functions may be provided as:

$$\mathcal{L}_{amp} = \frac{1}{FN}\sum_{i=0}^{F}\sum_{j=1}^{N} -\log \frac{\exp\left(|F_i^{(j)}| \cdot |(F_i^{(j)})'|\right)}{\exp\left(|F_i^{(j)}| \cdot |(F_i^{(j)})'|\right) + \sum_{k \neq j}^{N} \exp\left(|F_i^{(j)}| \cdot |F_i^{(k)}|\right)},$$

$$\mathcal{L}_{phase} =$$

$$\frac{1}{FN}\sum_{i=0}^{F}\sum_{j=1}^{N} -\log \frac{\exp\left(\phi(F_i^{(j)}) \cdot \phi((F_i^{(j)})')\right)}{\exp\left(\phi(F_i^{(j)}) \cdot \phi((F_i^{(j)})')\right) + \sum_{k \neq j}^{N} \exp\left(\phi(F_i^{(j)}) \cdot \phi(F_i^{(k)})\right)},$$

where $F_i^{(j)}$ is the j-th sample in a mini-batch, and $(F_i^{(j)})'$ is the augmented version of that sample.

Figure 4:
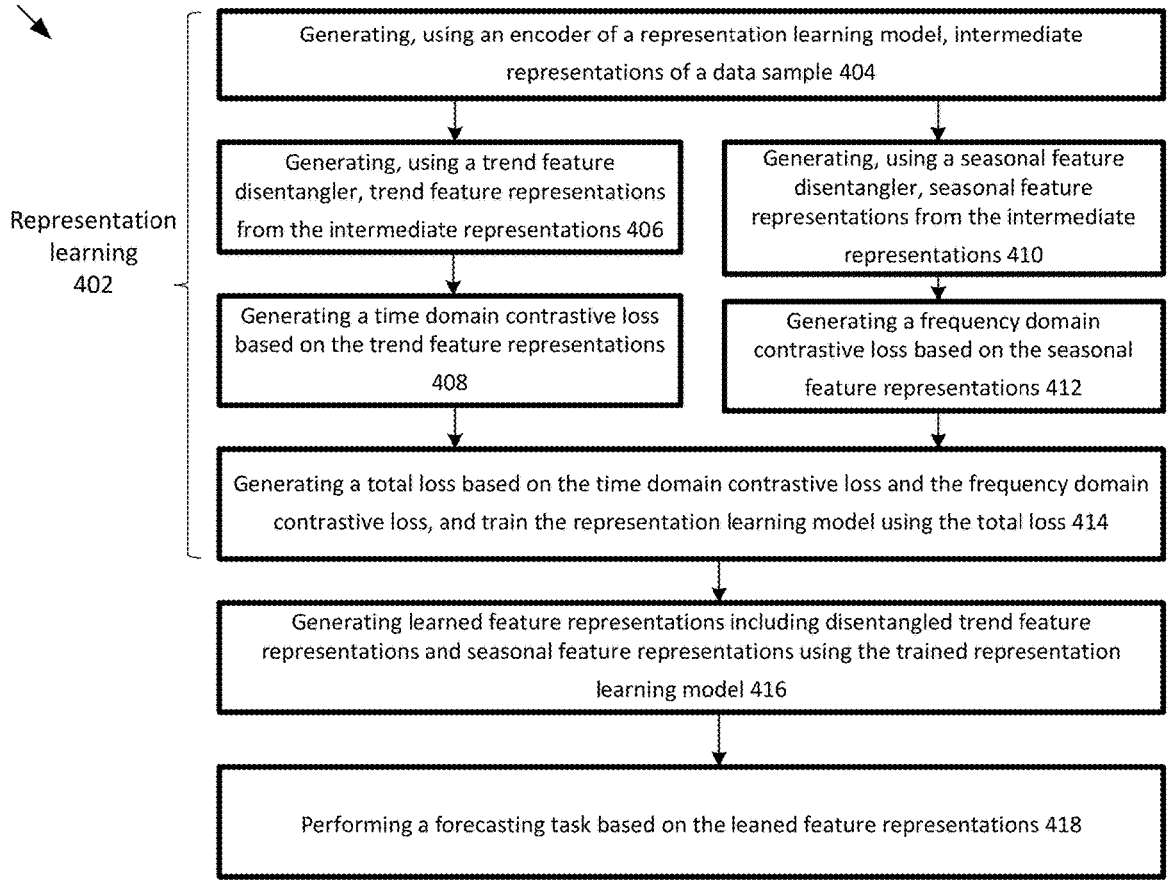
FIG. 4 is a flowchart illustrating an example method for using contrastive learning of disentangled seasonal-trend representations for time series forecasting.

Referring to FIG. 4, illustrated is an example method 400 for using contrastive learning of disentangled seasonal-trend representations for time series forecasting. The method 400 may perform representation learning method 402 to learn feature representations including disentangled trend feature representations and seasonal feature representations.

The representation learning method 402 may include block 404, where intermediate representations of a data sample is generated using an encoder (backbone encoder 202) of a representation learning model (e.g., representation learning model 200).

The representation learning method 402 may proceed to block 404, where a trend feature disentangler is used to generate trend feature representations from the intermediate representations. The representation learning method 402 may proceed to block 408, where a time domain contrastive loss is generated based on the trend feature representations. The representation learning method 402 may proceed to block 410, where a seasonal feature disentangler is used to generate seasonal feature representations. The representation learning method 402 may proceed to block 412, where a frequency domain contrastive loss is generated based on the seasonal feature representations. The representation learning method 402 may proceed to block 414, where a total loss is generated based on the time domain contrastive loss and the frequency domain contrastive loss. The representation learning model is trained using the total loss.

After the representation learning model is trained at block 402, the method 400 may proceed to block 416, where learned feature representations including disentangled trend feature representations and seasonal feature representations are generated using the trained representation learning model. The method 400 may proceed to block 418, where a forecasting task is performed based on the learned feature representations.

Figure 5:
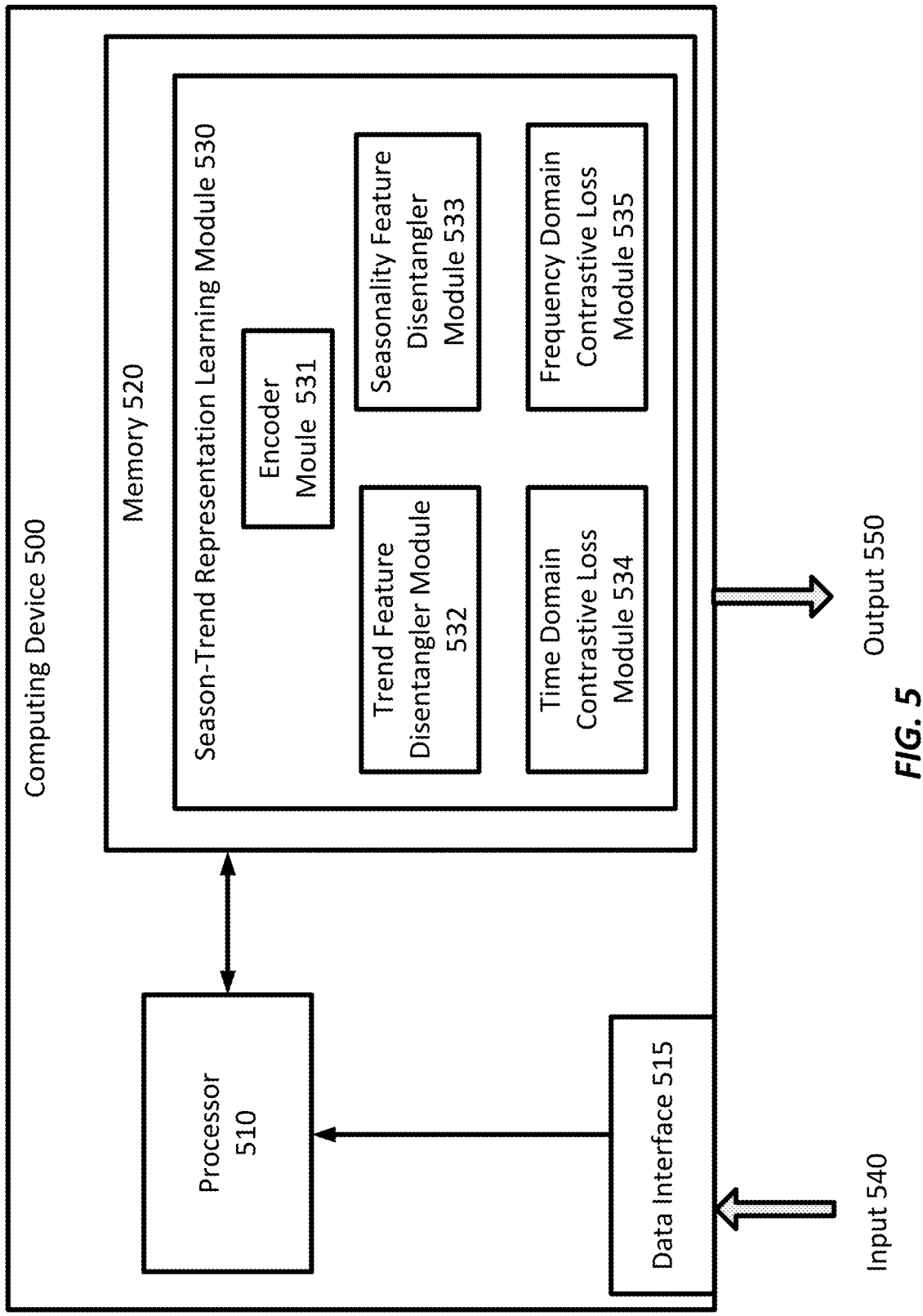
FIG. 5 is a simplified diagram of a computing device for implementing a seasonal-trend time series representation learning framework described in FIG. 1A, according to some embodiments.

FIG. 5 is a simplified diagram of a computing device 500 for implementing a disentangled seasonal-trend representation learning systems and methods for time series forecasting described in FIGS. 2, 3A, 3B, and 4 according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for a season-trend representative learning module 530 that may be used to implement and/or emulate the systems and models, and/or to implement any of the methods described further herein. A trained season-trend representative learning module 530 may receive input that includes a time series data 540 via the data interface 515 and generate representations of time series data 550 as output.

In some embodiments, the season-trend representative learning module 530 includes an encoder 531 (e.g., including a backbone encoder 202 of FIG. 2), a trend feature disentangle module 552 (e.g., including a trend feature disentangler 204 of FIG. 2), a seasonal feature disentangler module 533 (e.g., including a seasonal feature disentangler 206 of FIG. 2), a time domain contrastive loss module 334 and a frequency domain contrastive loss module 335 (which can be similar to the modules discussed in FIG. 2).

In various embodiment, the season-trend representative learning module 530 and its submodules 531-535, may be implemented by hardware, software and/or a combination thereof.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of using a machine learning (ML) model, wherein one or more hardware processors are configured to perform the method, comprising:

receiving, via a data interface, a training dataset of time-series data samples;

performing a first data augmentation on the training dataset to generate first augmented data samples;

performing a second data augmentation on the training dataset to generate second augmented data samples;

processing, with an encoder neural network including a temporal convolution network, intermediate representations for samples including the first augmented data samples and the second augmented data samples;

providing the intermediate representations to a trend feature disentangle model and a seasonality feature disentangle model of the ML model respectively;

evaluating, using a representation learning neural network of the ML model, one or more loss functions that evaluate errors between positive samples and negative samples identified in the samples including the first augmented data samples and the second augmented data samples based on the intermediate representations;

validating one or more values of one or more parameters of the encoder neural network and the representation learning neural network based at least in part on the one or more loss functions;

wherein the providing, evaluating, and validating processes further comprise:

generating, using trend feature disentangler model of the ML model, trend feature representations based on the intermediate representations, wherein the trend feature disentangler model includes:

a first autoregressive model implemented using a first causal convolution model having a first kernel size; and a second autoregressive model implemented using a second causal convolution model having a second kernel size;

wherein the trend feature representations are generated based on outputs of the first autoregressive model and the second autoregressive model;

generating, using the seasonality feature disentangler model of the ML model including a fast Fourier Transform unit, the seasonal feature representations based on the intermediate representations;

generating, using the representation learning model of the multi-layer ML model, a time domain contrastive loss based on the trend feature representations, wherein;

generating, using the representation learning model of the ML model, a frequency domain contrastive loss based on the seasonal feature representations; and providing a trained representation learning model by updating parameters of the representation learning model of the ML model based on a total loss including the time domain contrastive loss and the frequency domain contrastive loss.

2. The method of claim 1, further comprising:
generating, by the trained representation learning model, learned feature representations including disentangled trend feature representations and seasonal feature representations; and
performing a forecasting task based on the learned feature representations.

3. The method of claim 1, wherein the generating the one or more trend feature representations based on the intermediate representations includes:
generating, based on the intermediate representations, a plurality of representations using the plurality of autoregressive models respectively; and
generating the one or more trend feature representations by performing average pooling to the plurality of representations.

4. The method of claim 1, wherein the generating the one or more seasonal feature representations based on the intermediate representations includes:
transforming the intermediate representations into a frequency domain to generate frequency-domain representations;
applying a complex-valued linear layer with unique weights for each frequency to the frequency-domain representations; and
transforming the frequency-domain representations back to the time domain to generate the one or more seasonal feature representations.

5. The method of claim 1, further comprising:
performing a training process to update the parameters of the representation learning model based on the total loss.

6. The method of claim 1, wherein the frequency domain contrastive loss includes an amplitude contrastive loss and a phase contrastive loss.

7. A non-transitory machine-readable medium comprising a plurality of machine-readable instructions which, when executed by one or more processors, are adapted to cause the one or more processors to perform a method comprising:
receiving, via a data interface, a training dataset of time-series data samples;
performing a first data augmentation on the training dataset to generate first augmented data samples;
performing a second data augmentation on the training dataset to generate second augmented data samples;
processing, with an encoder neural network including a temporal convolution network, intermediate representations for samples including the first augmented data samples and the second augmented data samples;
providing the intermediate representations to a trend feature disentangle model and a seasonality feature disentangle model of the ML model respectively;
evaluating, using a representation learning neural network of the ML model, one or more loss functions that evaluate errors between positive samples and negative samples identified in the samples including the first augmented data samples and the second augmented data samples based on the intermediate representations;
validating one or more values of one or more parameters of the encoder neural network and the representation learning neural network based at least in part on the one or more loss functions;
wherein the providing, evaluating, and validating processes further comprise:
generating, using trend feature disentangler model of the ML model, trend feature representations based on the intermediate representations, wherein the trend feature disentangler model includes:
a first autoregressive model implemented using a first causal convolution model having a first kernel size; and
a second autoregressive model implemented using a second causal convolution model having a second kernel size;
wherein the trend feature representations are generated based on outputs of the first autoregressive model and the second autoregressive model;
generating, using the seasonality feature disentangler model of the ML model including a fast Fourier Transform unit, the seasonal feature representations based on the intermediate representations;
generating, using the representation learning model of the multi-layer ML model, a time domain contrastive loss based on the trend feature representations, wherein;
generating, using the representation learning model of the ML model, a frequency domain contrastive loss based on the seasonal feature representations; and
providing a trained representation learning model by updating parameters of the representation learning model of the ML model based on a total loss including the time domain contrastive loss and the frequency domain contrastive loss.

8. The non-transitory machine-readable medium of claim 7, wherein the method includes:
generating, by the trained representation training model, learned feature representations including disentangled trend feature representations and seasonal feature representations; and
performing a forecasting task based on the learned feature representations.

9. The non-transitory machine-readable medium of claim 7, wherein the generating the one or more trend feature representations based on the intermediate representations includes:
generating, based on the intermediate representations, a plurality of representations using the plurality of autoregressive models respectively; and
generating the one or more trend feature representations by performing average pooling to the plurality of representations.

10. The non-transitory machine-readable medium of claim 7, wherein the generating the one or more seasonal feature representations based on the intermediate representations includes:
transforming the intermediate representations into a frequency domain to generate frequency-domain representations;
applying a complex-valued linear layer with unique weights for each frequency to the frequency-domain representations; and
transforming the frequency-domain representations back to the time domain to generate the one or more seasonal feature representations.

11. The non-transitory machine-readable medium of claim 7, wherein the method includes:
performing a training process to update parameters of the representation training model based on the total loss.

12. The non-transitory machine-readable medium of claim 7, wherein the frequency domain contrastive loss includes an amplitude contrastive loss and a phase contrastive loss.

13. A system, comprising:
a non-transitory memory; and
one or more hardware processors coupled to the non-transitory memory and configured to read instructions from the non-transitory memory to cause the system to perform a method comprising:
receiving, via a data interface, a training dataset of time-series data samples;
performing a first data augmentation on the training dataset to generate first augmented data samples;
performing a second data augmentation on the training dataset to generate second augmented data samples;
processing, with an encoder neural network including a temporal convolution network, intermediate representations for samples including the first augmented data samples and the second augmented data samples;
providing the intermediate representations to a trend feature disentangle model and a seasonality feature disentangle model of the ML model respectively;
evaluating, using a representation learning neural network of the ML model, one or more loss functions that evaluate errors between positive samples and negative samples identified in the samples including the first augmented data samples and the second augmented data samples based on the intermediate representations;
validating one or more values of one or more parameters of the encoder neural network and the representation learning neural network based at least in part on the one or more loss functions;
wherein the providing, evaluating, and validating processes further comprise:
generating, using trend feature disentangler model of the ML model, trend feature representations based on the intermediate representations, wherein the trend feature disentangler model includes:
a first autoregressive model implemented using a first causal convolution model having a first kernel size; and
a second autoregressive model implemented using a second causal convolution model having a second kernel size;
wherein the trend feature representations are generated based on outputs of the first autoregressive model and the second autoregressive model;
generating, using the seasonality feature disentangler model of the ML model including a fast Fourier Transform unit, the seasonal feature representations based on the intermediate representations;
generating, using the representation learning model of the multi-layer ML model, a time domain contrastive loss based on the trend feature representations, wherein;
generating, using the representation learning model of the ML model, a frequency domain contrastive loss based on the seasonal feature representations; and
providing a trained representation learning model by updating parameters of the representation learning model of the ML model based on a total loss including the time domain contrastive loss and the frequency domain contrastive loss.

14. The system of claim 13, wherein the method includes:
generating, by the trained representation training model, learned feature representations including disentangled trend feature representations and seasonal feature representations; and
performing a forecasting task based on the learned feature representations.

15. The system of claim 13, wherein the generating the one or more trend feature representations based on the intermediate representations includes
generating, based on the intermediate representations, a plurality of representations using the plurality of autoregressive models respectively; and
generating the one or more trend feature representations by performing average pooling to the plurality of representations.

16. The system of claim 13, wherein the generating the one or more seasonal feature representations based on the intermediate representations includes:
transforming the intermediate representations into a frequency domain to generate frequency-domain representations;
applying a complex-valued linear layer with unique weights for each frequency to the frequency-domain representations; and
transforming the frequency-domain representations back to the time domain to generate the one or more seasonal feature representations.

* * * * *